United States Patent [19]

Popovich et al.

[11] Patent Number: 5,012,460
[45] Date of Patent: Apr. 30, 1991

[54] RAM HEAD POSITIONING AND TRACKING SYSTEM

[75] Inventors: Steve S. Popovich; Russell A. Meyer; William J. Stanis, all of Colorado Springs; Christopher Miller, Manitou Springs; Gary R. Mitchell, Woodland Park, all of Colo.

[73] Assignee: Information Storage, Inc., Colorado Springs, Colo.

[21] Appl. No.: 739,514

[22] Filed: May 31, 1985

[51] Int. Cl.$^5$ .......................... G11B 7/00; G11B 7/007
[52] U.S. Cl. .................................. 369/32; 369/44.26; 369/44.34
[58] Field of Search .................. 369/32, 33, 41, 44, 369/46, 43, 45, 47, 275, 59, 44.25, 44.34; 360/78; 365/234

[56] References Cited

U.S. PATENT DOCUMENTS

| | | | |
|---|---|---|---|
| 4,106,058 | 8/1978 | Romeas et al. | 369/33 |
| 4,142,209 | 2/1979 | Hedlund et al. | 365/234 |
| 4,363,116 | 12/1982 | Kleuters et al. | 369/32 |
| 4,364,118 | 12/1982 | Maeda et al. | 364/44 |
| 4,553,228 | 11/1985 | Gerard et al. | 369/46 |
| 4,562,562 | 12/1985 | Moriya et al. | 364/32 |
| 4,562,564 | 12/1985 | Bricot et al. | 369/44 |

FOREIGN PATENT DOCUMENTS 2127176 4/1984 United Kingdom .................. 369/32

Primary Examiner—Aristotelis M. Psitos
Assistant Examiner—Steven R. Garland
Attorney, Agent, or Firm—Richard W. Hanes

[57] ABSTRACT

A method and apparatus for positioning and tracking a Random Access Memory (RAM) optical head over an information storage media having a plurality of tracks formed by optically readable deformations ("pits") in the media including, a central controller, a laser diode optical-system carrying head which is movable transversely of the tracks in incremental steps for coarse positioning of the head over a selected band of tracks and a servomechanism which positions the laser's objective lens over a specifically addressed track and maintains it there until another track is addressed. Also discussed is a unique method of generating a tracking error signal as an input to the servomechanism which includes the asynchronous detection of a sector mark and the generation of an independent clocking signal from the synchronous detection of off-track pairs of pits spaced uniformly between other data in the track to produce the tracking error signal.

7 Claims, 9 Drawing Sheets

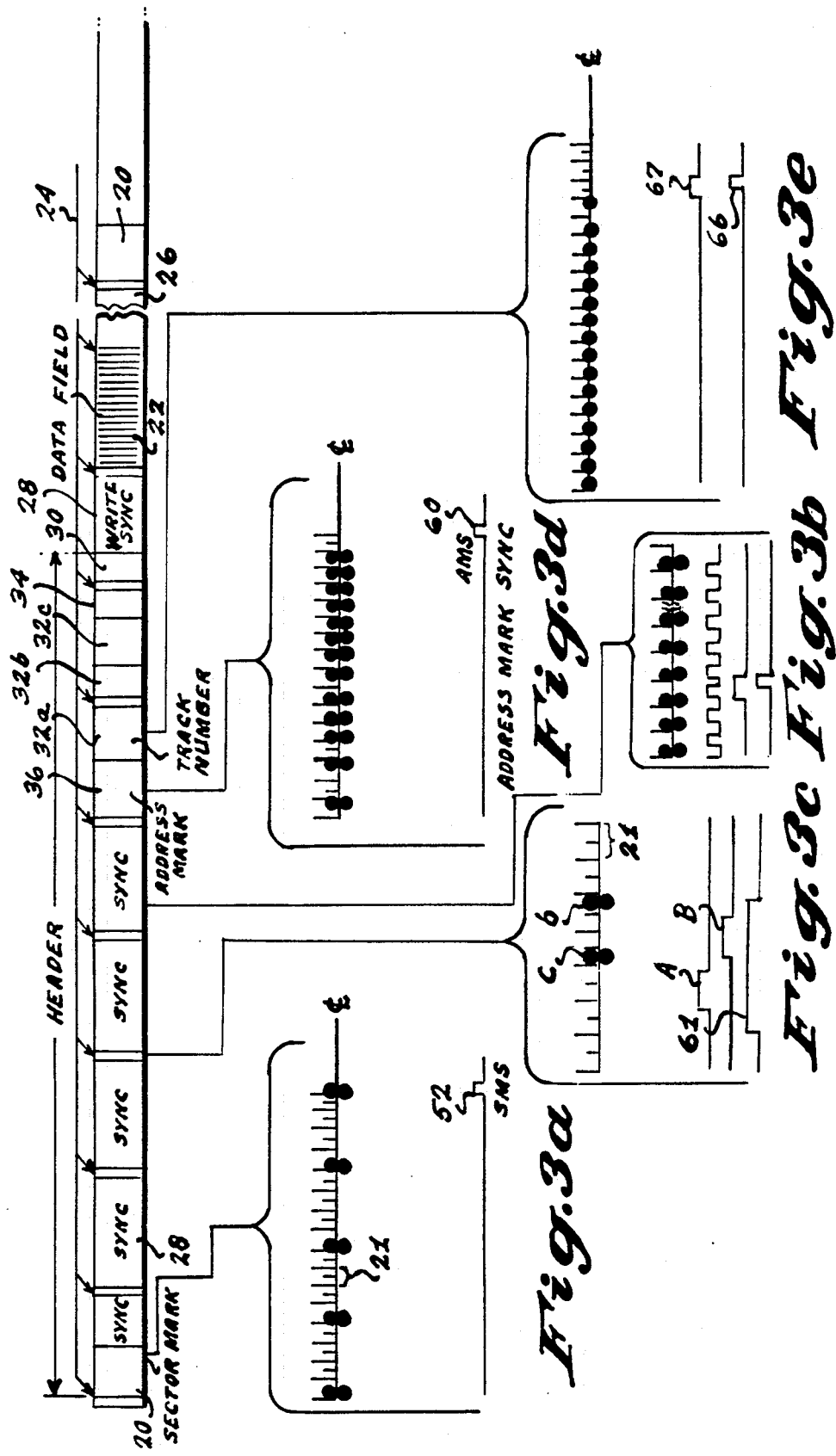

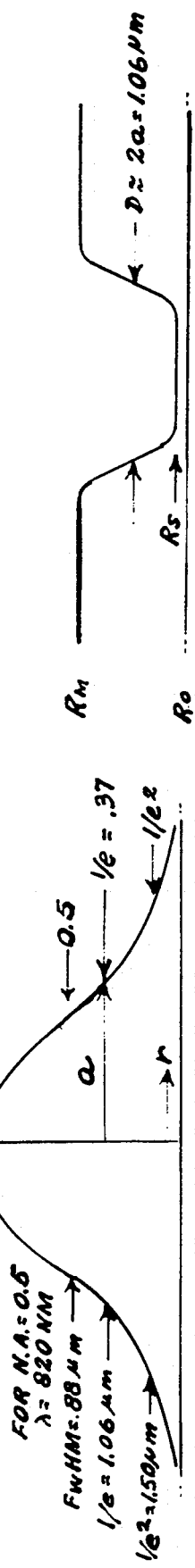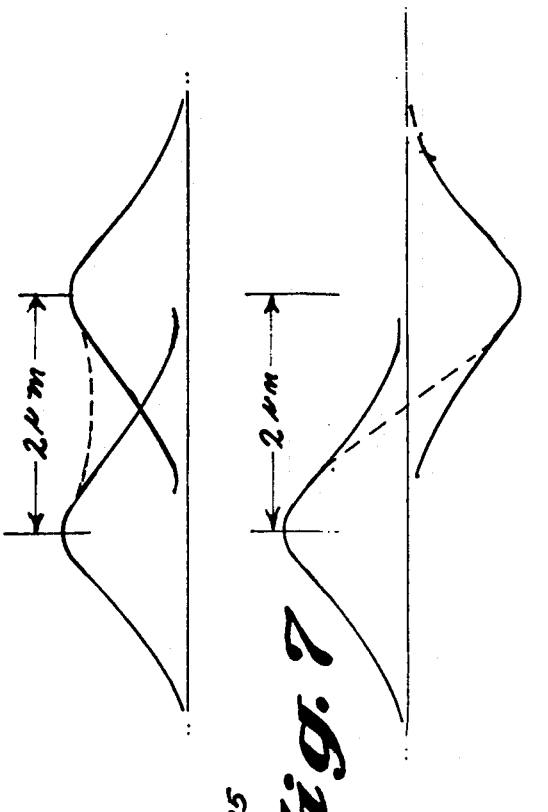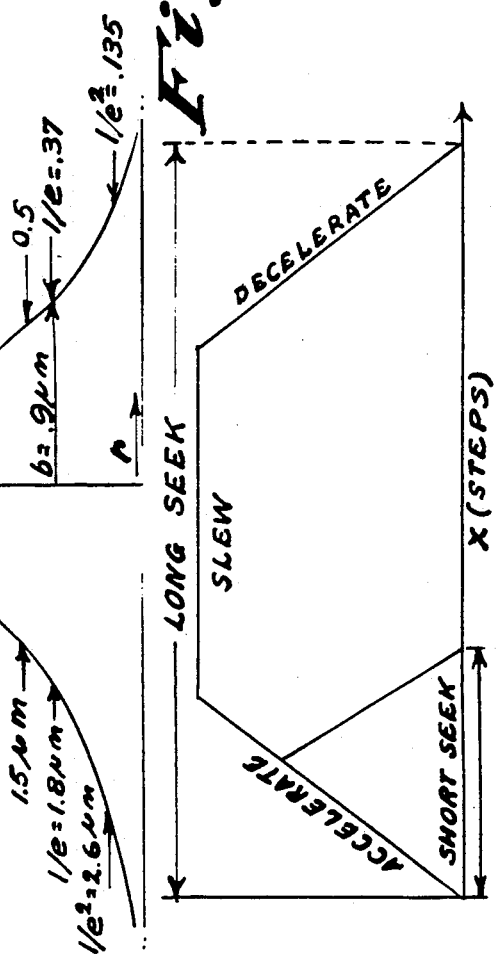

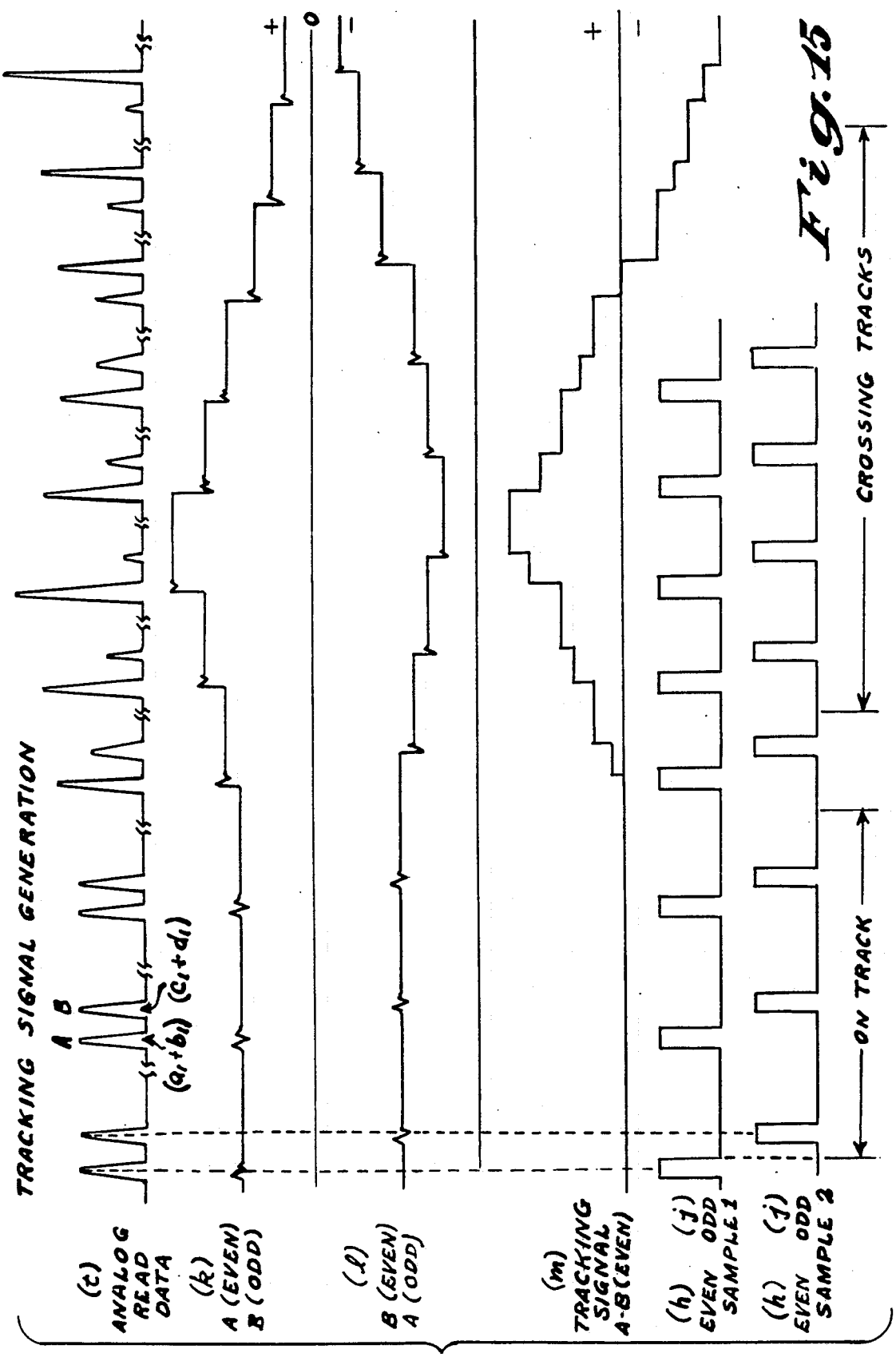

RAM HEAD POSITIONING AND TRACKING SYSTEM

BACKGROUND OF THE INVENTION

This invention relates to the positioning and tracking of the read/write head in an information storage system utilizing optically readable media. More specifically, the optical head utilizes a seek system of open loop coarse positioning over a band of tracks on the media disk together with a closed loop servo system to obtain accurate and precise positioning of the head over the desired track within the band. Once the desired track is found, the invention combines a unique media data format with a closed loop error detection circuit to cause the optical head to follow the track during a revolution of the media disk despite track runout and other inherent variations.

It has been known for some time that digital information systems with high storage densities can be achieved through the use of optical storage media. Implementation of this technology has been hindered, however, by a number of technical barriers. In particular, difficulty has been encountered in quickly achieving precise head-to-track alignment when moving along the radial axis of the media disk to find the addressed track, in staying in alignment with the rotating track, and in maintaining synchronization between the data on the various track sectors with the data recovery and decoding circuitry. These difficulties are more pronounced in optical media storage systems because a smaller amount of media area is allocated to each information track and thus more precise head to track alignment is required. A small media disk may contain over 12,500 tracks in a radial space of approximately twenty-three millimeters and have a track to track spacing of less than 2 micrometers. For a high performance system it is necessary to access the addressed track in a short time and then to accurately follow it so that substantive data may be written or read.

Accordingly, it is the primary object of the present invention to provide positioning and tracking apparatus for the read/write head of an optically responsive information storage system which will overcome the deficiencies and high cost considerations of past systems and which will rapidly seek, find and follow the addressed track.

A second object of the invention is to create a media storage disk having circular or helical data carrying tracks which are grouped into a number of coarse bands, any one band of which can be accessed by an open loop coarse head positioning apparatus.

A third object of the invention is to provide fine head positioning and tracking apparatus which will seek and follow a single addressed track within the band.

A further object of the invention is to eliminate the cumbersome and duplicative "pre-groove" system of tracking found in the prior art and utilize for such purpose a plurality of fields of off-track center line position (servo) data bits embedded in the media and interspersed at intervals between other data fields.

A still further object of the invention is to provide a track format for the media which will implement the fine positioning and tracking objectives and which at the same time will insure the precise synchronization of the data decoding circuitry with the data recorded on the media disk.

Another object of the invention is to provide a tracking servo system which is invariant (to the first order) to discrepancies in the far field pattern of laser light sources enabling maximum flexibility in laser diode selection and reduced cost and complexity of the read/write optical system.

Still another object of the present invention is to provide a head tracking system that substantially reduces the required alignment precision between the light beam and the detector, where the alignment tolerance is now limited only by the photodetector size.

Still further objects, features and advantages of the present invention will become apparent upon a reading of the following detailed description of a preferred form of the invention.

BRIEF DESCRIPTION OF THE DRAWINGS

FIG. 3 is a diagrammatic showing of the format of each sector of each track with five figures, 3a–3e representing the data recorded in the several fields which are connected to the sub-figures by lead lines. The plurality of vertical lines in the user data field each represent the interspersed tracking pits (4 bits) located between every four bytes of data. The FIG. 3 diagrams of the portions of the sector format are not to scale, nor are they proportionally representative of the space allocated to the separately indentified fields.

FIG. 7 is a graph showing the rate of movement of the coarse seek actuator.

FIG. 8 represents a representative intensity profile of a focused laser beam.

FIG. 9 is the profile of the reflectivity of a written pit.

FIG. 10 is an analog read back signal wave form, taking into consideration the profile of the laser beam and the reflectivity of a pit as shown in FIGS. 8 and 9.

FIG. 11 is a waveform illustrating the peak shift and amplitude reduction resulting from the unipolar read back of two pits at 2 micro meters center-to-center spacing. The dashed line represents the superposition of the two curves.

FIG. 12 shows similar waveforms to those of FIG. 11 except that the signals are bipolar. Superposition of the curves produces the dashed line.

FIG. 15 represents another series of wave shapes with letter labels corresponding to the location in the diagram of FIG. 13 where those wave shapes are found, proceeding from the analog data (A and B) read from the tracking pits to the generation of the tracking error signal (m). Both the analog signals (t) and the tracking error signal (m) assume track crossings on a rotating disk as opposed to the static disk crossing patterns shown in FIG. 6.

SUMMARY OF THE INVENTION

Prior to engaging in a detailed description of a preferred form of the invention a summary of terms and of the system operation sequence will assist in a more complete understanding of the method and apparatus involved in positioning and tracking the optical head in an information storage and retrieval system according to the present invention.

First it is noted that the optical read/write head being referred to in this specification is a unitary structure containing a laser diode light source, collimating and transmission optics, a focusing objective lens, a beam focus system, tracking and positioning devices such as an incremental motor and an independently functioning fine positioning servo motor, a read beam separation system and a photodetector.

The present invention concerns the total tracking and positioning system which moves the head in discrete coarse steps and then utilizes a spring-mass motor, a linear motor, a piezo motor or similar device which functions as a part of a closed loop servo system (closed with respect to the media disk tracks) to position and maintain the laser's objective lens over the desired track during a revolution of the media disk.

Secondly, the reading and writing of data in the optically responsive media of the rotatable disk can be accomplished within the scope of this invention by the use of holes, apertures, depressions, pits, protrusions or any other deformations or change of state of the media which will respond to an optical beam. Any or all of the foregoing may be hereinafter referred to as "pits" or "data bits" in the media.

The apparatus of the present invention comprises two actuators: an infinite resolution motor, such as a spring mass motor, for fine positioning of the objective lens of the optical system, mounted on top of a larger coarse actuator for positioning the head over a selected band of circular tracks on the media disk. Both actuators operate semi-independently of each other with the exception that they are both monitored to insure that their position corresponds to the desired track address.

Figure 1:
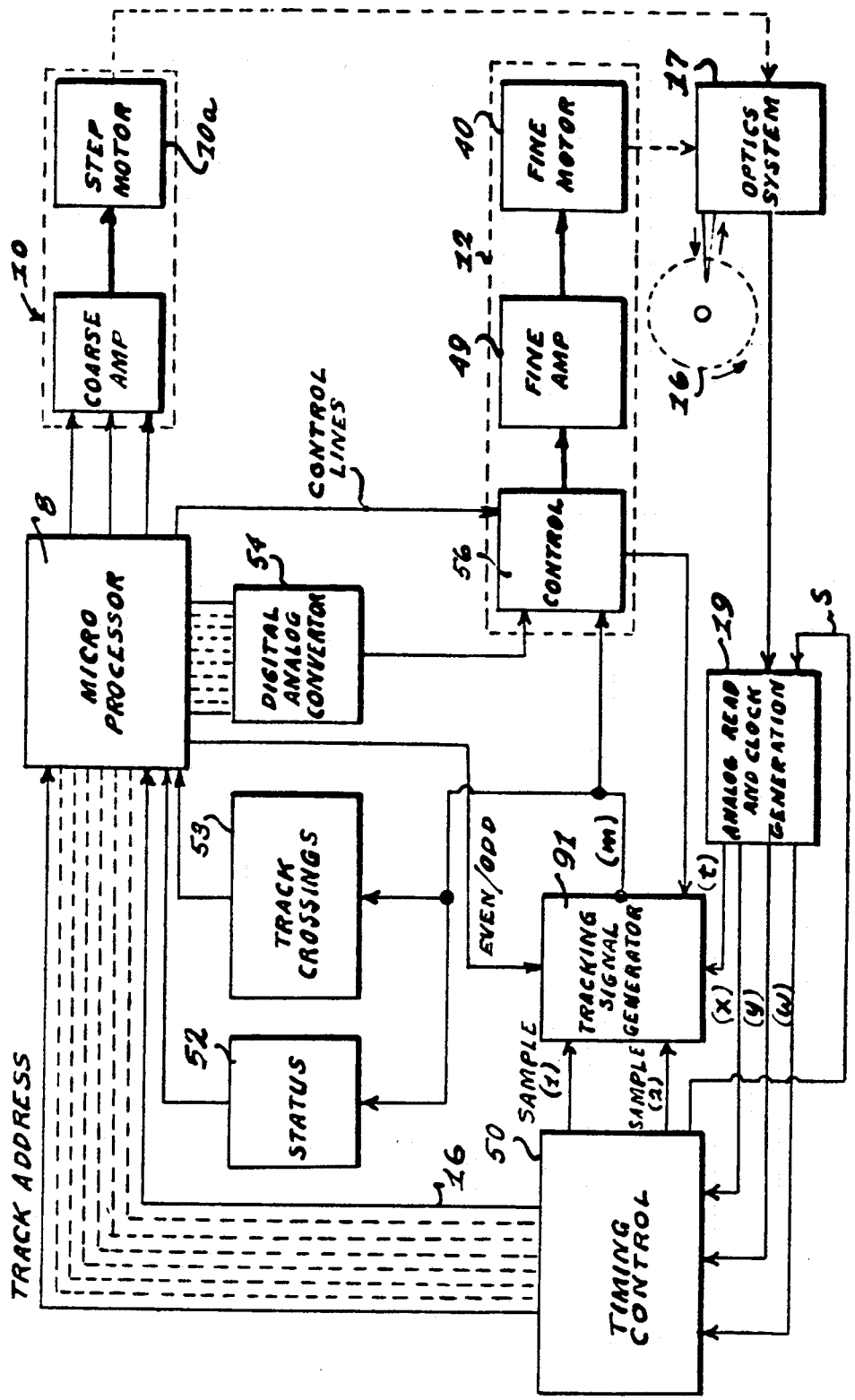
FIG. 1 a block diagram of the coarse-fine system for positioning and tracking a read/write RAM head.

For a summary description of the system, reference is made to the block diagram of FIG. 1. A rotatable media carrying disk 16 is shown which receives and stores data written in the media by a laser light beam. The data is written by the serial deposition of pits to form generally circular tracks in the media. Serial deposition of the pits is described; however, it is to be understood that in some of the fields in a track the pits are also written in side by side and longitudinally displaced pairs and the pairs are serially placed to form portions of the tracks. Although the media referred to in this specification is shown on a circular rotatable disk, the methods and apparatus of the invention can be employed on any type of media carrier.

The primary control source, an 8 bit microprocessor 8 has outputs to a coarse actuator 10 and a fine positioning servo system 12. When the micro-processor 8 is sent a track number to be accessed, the then existing track address of the head is determined. If the desired track is within the coarse band location over which the read/write head is located, a fine seek operation is performed to change track locations within the band. If the desired track is outside the presently addressed range location of the head a signal from the microprocessor's coarse seek algorithm activates a step motor 10a in an open loop sequence (with respect to the tracks) to reposition the head over the band containing the target track. A specific track under the head is read to confirm that the correct band of tracks has been acquired. If the track which was read is not the target track then the fine positioning servo system 12 functions to acquire the addressed track for either a read or write operation. Once located over the right track the coarse positioner will remain fixed and the fine positioner will function to maintain alignment with the track throughout a revolution by processing the information assimilated from reading the off-track data bits positioned between every four bytes of data in the sector.

A significant part of the invention with respect to the seeking and tracking system involves proper synchronization and clocking in order to know where the optical light beam is positioned at any given time and to this end a novel format of the sectors of each track is established. Each sector contains a header portion containing information necessary to the control system and a data portion containing the substantive data to be written in the sector. The inter-relationship between the various fields of the header and the electronic components of the tracking system will be explained below.

DETAILED DESCRIPTION OF THE PREFERRED EMBODIMENT

The preferred embodiment of the invention comprises an optics system 17 having a source of focussed light and a means for detecting light reflected from the pits in a rotating media disk 16 having a unique data format and an electronics system, including motors, to address and track a specified circular path on the disk.

Figure 2:
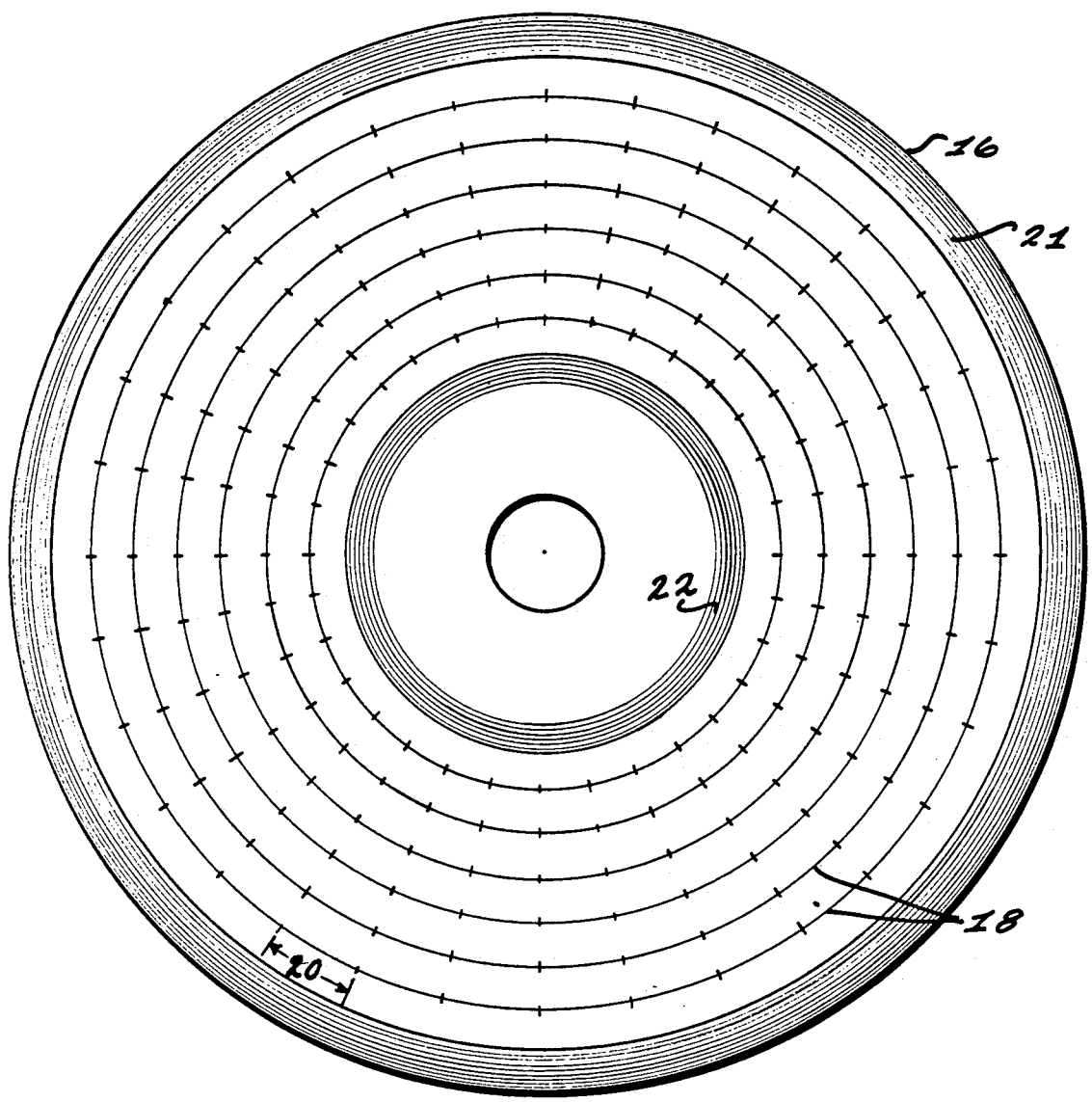
FIG. 2 is a diagrammatic plan view of a media disk showing representative tracks and radial lines depicting the boundaries of the sectors on the tracks.

The media disk is traditional except for the format of data thereon. As seen in FIG. 2, the disk 16 comprises one or more circular pieces of glass, plastic or other appropriate substrate base material having a media coating on at least one surface thereof which is responsive to laser light. As stated earlier, the media is capable of receiving and retaining small sequentially formed deformations or pits representing binary coded data in either cylindrical or helically formed patterns called "tracks" around a spindle aperture in the center of the disk. The circular tracks 18 are preferably concentric and are circumfused about the center of the disk. Each track is divided into a plurality of sectors 20 (in the illustrated embodiment thirty-two sectors). Each of the sectors within a track contains substantive data and information which is written in a unique format that can be interpreted by the error detection and synchronization circuits described in greater detail below. The format of the various sectors is shown in FIG. 3.

For a 13 cm diameter disk, for example, there may be 12,520 tracks over a radial distance of approximately 23 millimeters, comprising an outer guard band 21 of 200 tracks, an inner guard band 22 of 100 tracks and 12,220 data tracks in between. The purpose of the guard bands is to detect overrun of the head during the coarse selection mode.

Preferably, each sector of each data track contains a 360 byte (B) capacity, consisting of the following fields:

|  |  | Ref. Numeral |
| --- | --- | --- |
| sector mark | 2B | 20 |
| synchronization | 21B | 28 |
| servo tracking pits | 40B | 24 |
| (4 bits in each of 10 fields) |  |  |
| address mark | 2B | 36 |
| track number, sector number and | 5B | 32 |
| cyclic redundancy check |  |  |
| bad sector flag | 1B | 34 |
| write decision | 1B | 30 |
| user data | 256B | 22 |
| error correction code | 32B | 26 |
|  | 360B |  |

Each sector begins with the 2 byte sector mark 20 comprising five equi-spaced data bits written in sixteen adjoining cells 21. See FIG. 3a. (a "cell" is defined as single adjoining clock and data spaces for a pit signifying either a binary 1 or 0).

Following the sector mark 20 in each track are a series of synchronizing fields 28 (see FIG. 3b), each separated by a four bit (nibble) space 24 containing a pair of pits 35 (see FIGS. 3c and 4) the center of each of which is offset from the track center line by 0.4 micrometers (hereinafter referred to as the tracking pits, each pair collectively by reference numeral 35 and separately, for two tracks, by letters a, b, c, and d). The position of the tracking pits is unique for the odd and even track numbers. On odd numbered tracks the pit "a" in cell location number 1 is written in the clock position of that cell and is offset toward the center of the disk. On even numbered tracks the pit "b" in cell location number 1 is written in the clock position of that cell but is offset away from the center of the disk. On odd numbered tracks the pit "d" in cell location number 2 is written in the data position of that cell and is offset away from the center of the disk. On even numbered tracks the pit "c" in cell location number 2 is written in the data position and is offset toward the center of the disk. Details of how the tracking pits function to provide the initial input to the tracking error signal generator will be provided subsequently.

Adjacent the pair of tracking pits 35 which follow the last synchronizing field appears the two byte data address mark field 36 (see FIG. 3d) and a five byte track number, sector number and cylic redundancy check (CRC) field 32 (see FIG. 3e). As seen in FIG. 3, there follows a number of subsequent fields, including the substantive data field, which are significant to the reading and writing operations of the system and user data storage but which are not relevant to the present invention, except to note that between each group of fields having a total of 4 bytes and between each four bytes of user data there is inserted a pair of tracking pits 35 as a servo "nibble" field 24 to provide precise head-track alignment throughout each revolution of the disk 16.

Each of the data bits in the sector mark sync and address fields is written to the side of the track center line and each bit is matched with a corresponding bit on the other side of the track center line, as seen in FIGS. 3a, 3b and 3d, similarly to the way in which the tracking pits 35 are written off-center of the track to which they relate. The purpose of pairing each of the data bits to straddle the track center line is to provide continuous information to the optical head during track crossings in order to maintain the sector data bit count and synchronization as set forth more fully in the section on tracking and timing.

COARSE SEEK

Until changed by a signal from the microprocessor 8, the coarse seek system 10 maintains a constant position by being locked on to a step location of the step motor 10a which is within a given range of the desired track address.

During initialization of the system the fine actuator 40 is locked on to the track over which the head is positioned. The track address is read and the microprocessor correlates the coarse step motor location with the actual track location. Since the track width is known and the coarse increment size is known the desired track address may be correlated to a specific coarse step location. The processor 8 maintains a correlation of specific track addresses to each coarse increment location. The processor also maintains the then present coarse step count, and calculates the number of coarse steps and the direction of movement required to find the band containing a new track addressed.

The speed of radial movement of the head, as driven by the coarse positioning step motor is regulated by the processor. In order to obtain the fastest response, the processor must accelerate the coarse actuator as fast as possible, yet limit its peak speed to that allowed by the available decelerating and stopping force in the coarse motor. To accomplish this, trajectories of timing are stored in the memory of the processor 8. In long seeks the head will be made to accelerate to the maximum speed, then move at a constant rate, and then decelerate to stop at the desired location. For shorter seeks, the head may not reach constant velocity but will merely accelerate a number of steps and then decelerate to stop at the desired location (See FIG. 7).

The processor 8 calculates the correct number of acceleration, constant speed and deceleration pules to bring the head to the desired location over a specified band of tracks. The processor also controls timing variations to aid in seek damping when arriving at the desired location.

FINE SEEK SERVO

Once the head is positioned over the band of tracks containing the one to be addressed, a fine seek is performed by driving the fine motor 40, a part of the fine seek sample data velocity servo system. The processor measures the amount of time it takes to cross a track ($\Delta t$) by detecting the zero crossing points 46 of an error signal (See FIGS. 6 and 15). The physical spacing from one zero crossing to the next indicates one track width ($\Delta d$) (N−1 to N in FIG. 6) which is defined by the media format. As a result, the average velocity can be calculated by the processor. (Average velocity=$\Delta d/\Delta t$).

The desired velocity is stored in the memory of the processor and is algebraically subtracted from the determined average velocity to generate a signal representing the velocity error. An error velocity signal is then output from the processor 8 to a digital to analog converter 54 which in turn drives the fine actuator power amplifier 49 which drives the fine positioning motor 40 to correct the radial velocity of the head with respect to the media tracks. (See FIG. 1).

The velocity of the fine actuator must be maintained high enough so that the track crossing sample rate supports stability, however the velocity must be low enough to enable the tracking servo to capture the addressed track. A sample data servo analysis determines the necessary velocity loop gain and sample rate which will maintain the seek stability. The servo loop bandwidth is selected on the basis of the velocity accuracy which is required to be maintained in view of external disturbances such as vibrations and runouts. A loop bandwidth of 200 Hz is sufficient to overcome typical disc drive disturbances. In order to maintain an adequate velocity loop phase margin (approximately 45°) a sample rate of 4 KHz is necessary. If the track spacing is 1.8 micrometers a velocity of $7.2\times10^{-3}$ meters per second would result.

OPTICAL READ SIGNALS

As was mentioned above, the optical read/write head contains a laser diode light source, a means for transmitting and focusing laser light on the media surface and a photodetector system for reading the beam after it is reflected from the media surface. The following discussion will illustrate the details of how the tracking pits 35 produce an analog tracking error signal which drives the fine positioning motor 40 to maintain proper light beam alignment over the addressed track during a revolution of the media disk. FIG. 8 shows the intensity profile of a focused laser beam emitted from the laser diode light source, i.e., the power distribution of the focused spot on the sensitive layer of the media, where "a" is the radius of the spot at the $I_o/e$ intensity point, "r" is the radius or distance from the center of the spot, and Io is the intensity at the center of the spot where r is zero. The total power focussed on the spot may be obtained by taking the appropriate integral over the surface area according to the equation:

$$I(r) = I_o e^{-\frac{r^2}{a^2}}$$

$$P_{total} = \int_0^{2\pi}\int_0^{\infty} I_o e^{-\frac{r^2}{a^2}} r\,dr\,d\phi = I_o d^2 \pi$$

FIG. 9 depicts the reflectivity profile of a written pit in the optical media. In this figure, $R_M$ represents the reflectivity of the sensitive area of the media, $R_S$ is the reflectivity of the substrate, which is approximately 10% of the reflectivity of the media. The mean diameter of the pit is approximately $2a$, which corresponds to the diameter of the focussed beam at the 1/e intensity level as shown in FIG. 8.

To determine the wave form of the read back signal, a convolution of the focussed beam and pit reflectivity must be performed. This calculation may be performed either numerically or by a simplified approximation of the beam profile and pit reflectivity.

FIG. 10 shows a read back signal waveform obtained by the simplified approximation method mentioned above, where "r" represents the radius or distance from the center of the pit, "b" is the distance from the center of the pit where the read back amplitude is $A_o/e$, and Ao is the amplitude when the beam is centered over a pit. The readback waveform is 1.5 micrometers FWHM for ablative media used in conjunction with a laser diode. The waveform is nearly Gaussian and may be represented by the equation:

$$A(r) = A_o e^{-\frac{r^2}{b^2}}$$

In FIG. 11 the dotted line represents the result of superposition of two unipolar read back signals resulting from the optical readback of two pits at 2 micrometer center-to-center spacing. It should be noted that, in this case, there is no significant peak shift due to the "tails" of the signals. The amplitude degredation for this case in terms of resolution or "eye opening," however, is significant. In FIG. 12, the dotted line represents the result of superposition of two bipolar signals which are otherwise identical to the two unipolar signals shown in FIG. 11. Once again, the peak shift is not significant; but, for this case, the amplitude or resolution degredation is also insignificant. There is, therefore, a great contrast between the results obtained from the unipolar and bipolar cases.

The foregoing discussion of signals was principally concerned with data readback signals or with the effects of the interaction of the laser beam with pits along the track centerline or tangential to that centerline. Since the beam and the pits are each symmetrical, the same model can be used to analyze the signals obtained when crossing tracks, substantially along the radial axis of the media disk, but taking into consideration a diagonal vector direction due to disk rotation.

Figure 4:
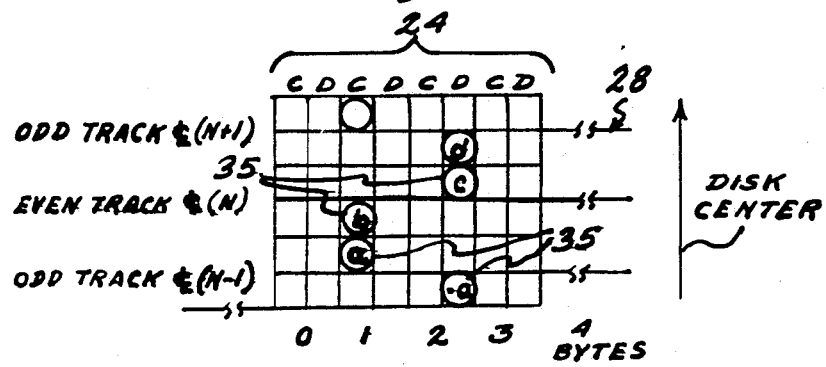
FIG. 4 is a diagrammatic plan view of the 4 bit space between each four bytes of data shown in the format diagram of FIG. 3, illustrating the placement of the tracking pits in respect to three exemplary tracks, N+1, N and N−1.
Figure 6:
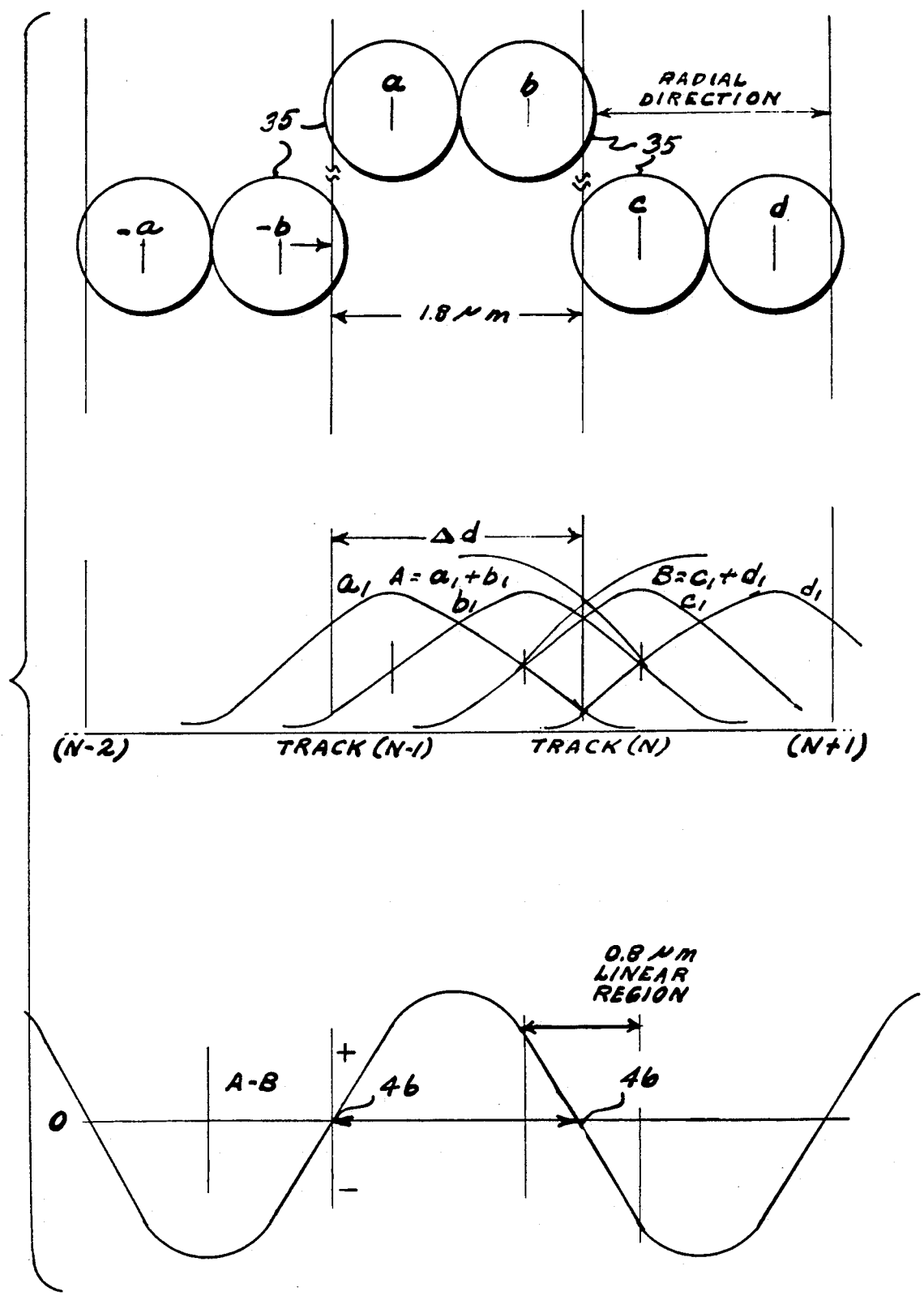
FIG. 6 is a diagrammatic view of the tracking pits which were shown in FIG. 4 in juxtaposition with a series of wave forms representing the signal derived as a function of radial displacement from a position of maximum amplitude when a beam is centered over the respective pit centers. The four curves $a_1$–$d_1$ would be developed if the light beam were moved radially across a static disk. Curves A and B represent a composite of amplitude curves $a_1$ plus $b_1$ and $c_1$ plus $d_1$, respectively. The centers line of four representative tracks are indicated as N−2, N−1, N, and N+1. The radial direction on the media disk is indicated by a horizontal two-headed arrow in the figure. A wave form derived from subtracting signals A and B for track N and a similar subtraction for adjacent tracks N−1, N−2, and N+1, is also shown.

Small portions of two cylindrical tracks, N and N−1 are diagrammatically depicted in FIG. 6 which should be cross-referenced to FIG. 4. These Figures show the tracking pits 35 which are displaced in the radial direction from the track centerlines. The signal wave forms in FIG. 12 represent the readback signals from the pits as a function of radial displacement from a position of maximum amplitude when a beam is centered over the pit centers. In FIG. 6, the pits lettered a, b, c, and d produce signals $a_1$, $b_1$, $c_1$, and $d_1$, respectively. The maximum amplitude shown for each of these signals is the amplitude which would be obtained from the read back signal if the center of the focussed laser beam corresponded precisely with the center of the pit as the beam moves radially across a nonrotating disk. In this system, the alignment of the beam with the pits is examined by synchronously sampling the pit centers in the tangential direction with a phase locked loop. (See Tracking and Timing Section for explanation of obtaining sync.)

Figure 14:
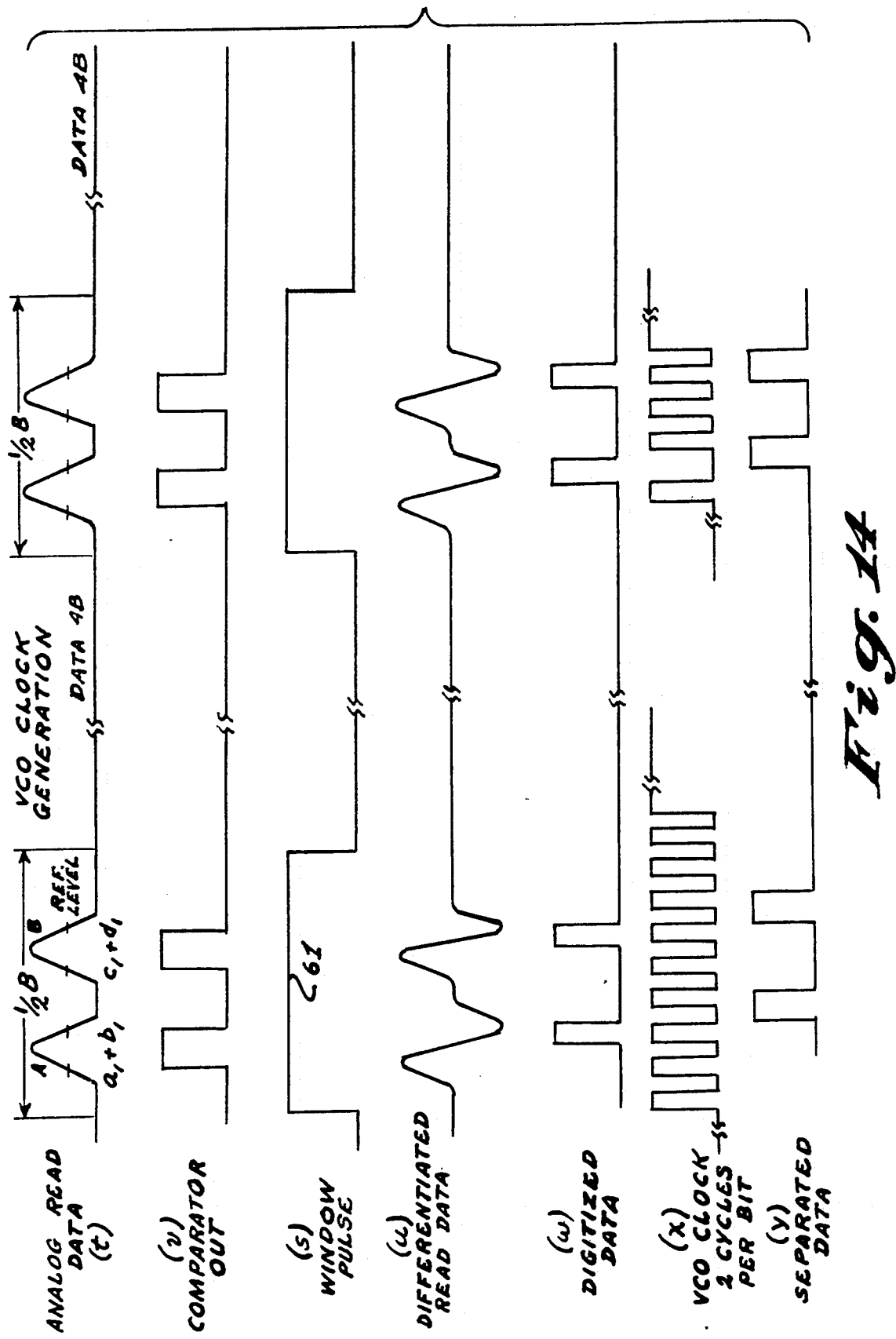
FIG. 14 represents a series of wave shapes with letter labels corresponding to the location in the diagram of FIG. 13 where those wave shapes are found, illustrating the Voltage Controlled Oscillator (VCO) clock generation.

Signal A, shown in FIGS. 6, 14 and 15 is the result of combining signals $a_1$ and $b_1$. Similarly, signal B is the result of combining signals $c_1$ and $d_1$. It should be noted that signals A and B are not obtained from the addition or superposition of signals $a_1$ and $b_1$ or $c_1$ and $d_1$, respectively. The principle of superposition may be used only when adding overlapping "tails" and cannot be used when the bodies of the signals are substantially overlapped, as is the case when the pits are closely spaced.

By subtracting signal B from A, the error signal shown in FIG. 6 is obtained. The result is an extremely linear signal whose linear region corresponds to alignment of the focussed beam within ±0.4 micrometers of the track centerline.

TRACKING AND TIMING

The error signal described above is used to make adjustments in the position of the laser's objective lens over a specific track through a servo loop comprising the motor 40 and its control components, the optics system 17, the Analog Read and Clock Generation circuitry 19, the Timing Control 50 and the Tracking Signal Generator 91. The motor 40 in the tracking servo loop consists of a spring mass actuator with lead-lag compensation and a low frequency integrator. The integrator compensates for track-to-objective offsets and the lead-lag maintains stability. The loop gain is kept high enough to maintain the tracking accuracy required for reading and writing, despite track runout variations. The error signal in the servo loop will have gain regulation with standard disk Automatic Gain Control (AGC) circuitry to compensate for signal variations. Classical servo analysis will indicate that for most disk drive disturbances (runout vibration, etc.), that a 2 Khz bandwidth will maintain sufficient accuracy. This loop bandwidth also demonstrates desirable capture characteristics for the desired seek rate of $7.2 \times 10^{-3}$ meters/sec.

The fine tracking loop runs continuously during the tracking mode and is only interrupted to execute a seek. Maintaining adequate gain and phase margin in the loop supports track following accuracy and also determines the track capture characteristics, as discussed in the prior section on fine seek.

Figure 13:
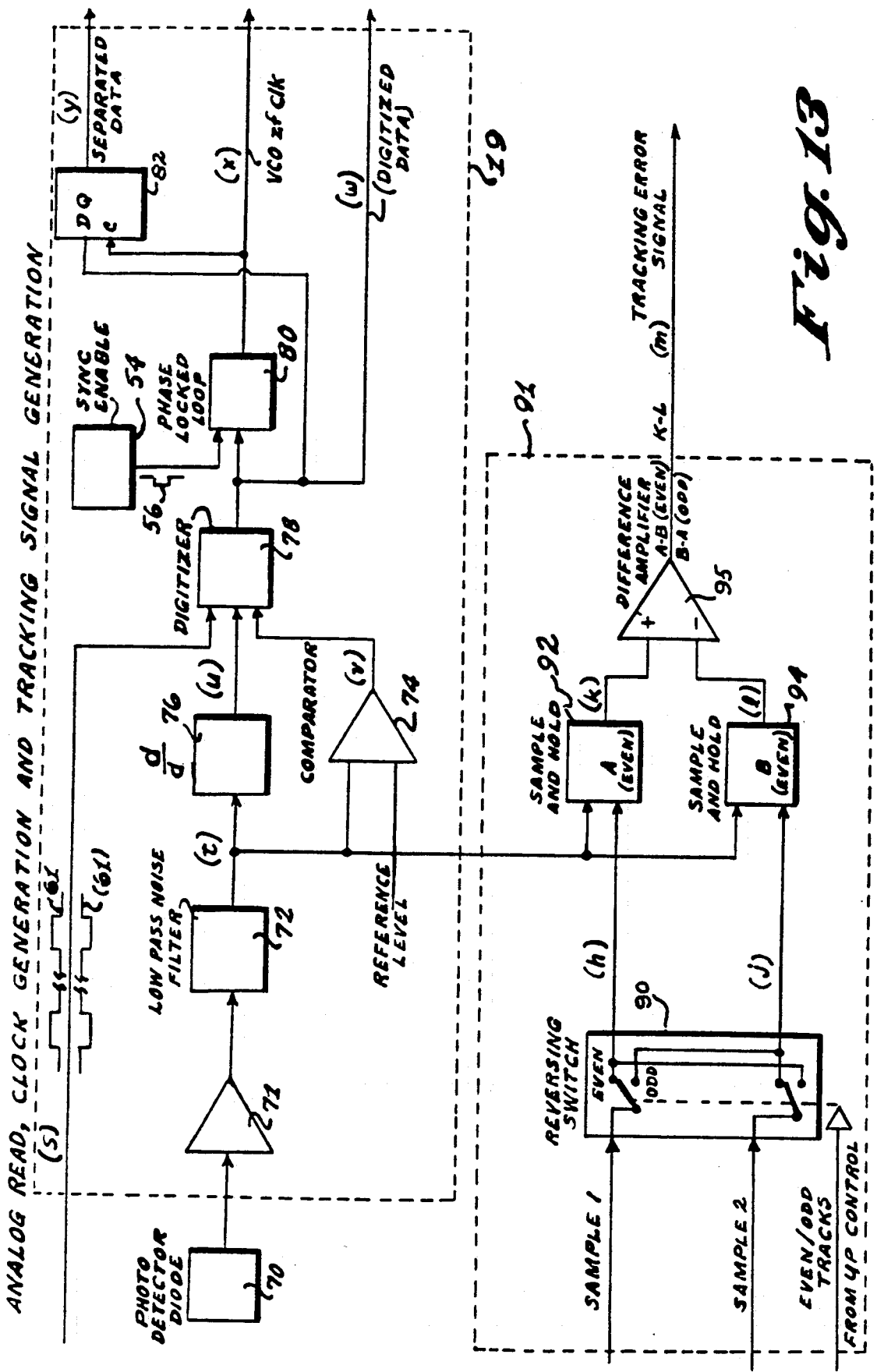
FIG. 13 is an expanded block diagram of the components comprising the blocks in FIG. 1 labeled as "Analog Read and Clock Generation" and "Tracking Signal Generator" and also showing the photo detector diode which is part of the Optics System, as shown in FIG. 1.

Although the basic development of the error signal which drives the fine seek servo motor 40 has been described in connection with FIG. 6, it is also essential that proper synchronization be established and maintained to develop the signals generated from reading the reflected light from the tracking pits 35. As seen in FIG. 13, a photo detector diode 70 receives the reflected light from the data pits, including the tracking pits 35, in the disk media and the signals therefrom are amplified at 71 and directed through a low pass noise filter 72 to produce the wave shapes (t) shown in FIGS. 14 and 15 (shown only for the tracking pits 35). A comparator 74, with an input reference level voltage, produces the square waves designated as (v) in FIG. 14. After differentiating the analog signals (t) the differentiating circuit 76 produces a signal (u) which is fed to a digitizer 78, together with the output of the timing generator, as modified by the read/write gate, and the comparator output (v). The digitized output (w) provides to the phase locked loop circuit 80 the information during the occurrence of the tracking pits 35 in the data field 22, to phase lock the data clock with the data.

During a read operation, the pulse 61 provides an open window to the digitizer 78 and the digitized data signal is fed to the phase locked loop 80. During a write operation, or at idle, the window is closed and the phase locked loop depends on the frequency and phase information from the sync field 28. In defining the inputs to the phase locked loop 80, it should be pointed out that during start up, before the window signal 61 is available, the sync enable signal 56 enables the phase locked loop to obtain its frequency and phase information from the sync fields 28. The phase locked loop circuit 80 output appears as the VCO clock (x) (2fClk) having a frequency of two cycles per bit. The unique production and subsequent use of the VCO clock accomplishes several important objectives. The clock pulses allow data to be uniformly written in the data fields between the one-half byte fields containing the tracking pits and permits the data fields to be read at the appropriate time as the optical system scans the sector. The independent derivation of the clock signal does not restrict the data encoding method to self clocking types of codes. Furthermore, the pattern of the tracking pits allows clocking information to be available at any point between tracks to provide continuously available information for tracking.

The digitizer 78 output (w), referred to as digitized data, or data that has been amplified, filtered and translated into logic levels is fed to a flip flop circuit 82 which synchronizes the comparator output (v) with the 2fClk, to produce a separated data signal (y).

Figure 5:
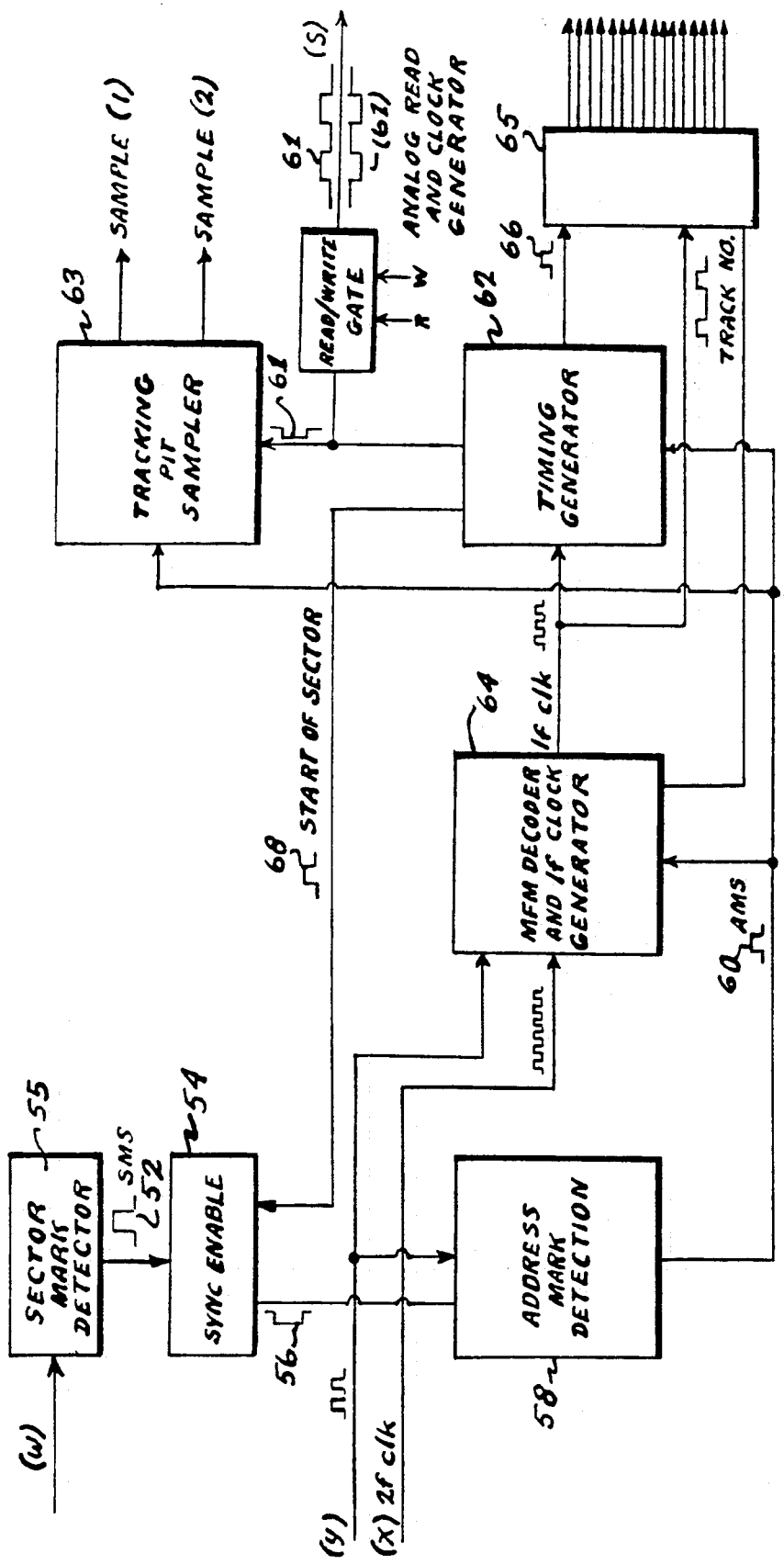
FIG. 5 is a block diagram of the logic system used to develop the tracking pit sampling signals from the Analog Read and Clock Generation circuits. This diagram is an exploded view of the block entitled "Timing Control" found in FIG. 1.

Referring now to FIG. 5, digitized data (w) from the Analog Read and Clock Generation Circuit 19 is sampled on a continuous basis by the Sector Mark Detector circuit 55. This circuit looks for a unique data pattern that can be detected asynchronously to the data recovery clock. The pattern is five data bits, spaced eight cells apart, as shown for the sector mark field 20 in FIG. 3a. The circuit measures the time between each data bit and generates a Sector Mark Sync (SMS) signal 52 when five bits occur with the proper spacing.

The SMS signal is fed to the sync enable circuit 54 and causes that circuit to produce a Sync Enable signal 56 which creates a sample window timing interval, thereby enabling the Address Mark Detection (AMD) circuit 58 to look for a valid Address Mark. This window 56 is open during the header portion of the sector (See FIG. 3). Upon detection of a valid Address Mark in the Address Mark field 36, as shown in FIG. 3, the AMD 58 produces a signal called Address Mark Sync (AMS) 60. This signal is used to synchronize the Timing Generator 62 to a known bit count within the data sector and to synchronize the 1fClk generator 64 and establish its correct polarity relative to the data. The Timing Generator 62 is comprised of a series of counters which count the bits within the sector. Because the AMS signal 60 occurs at a known position within the sector, at a known bit count, the Timing Generator 62 and the Tracking Pit Sampling circuit 63 are precisely synchronized to this count and, from that point on, are locked to the bits within the sector.

Once it has been synchronized, the Timing Generator 62 generates a start of sector signal 68 to indicate the start of a sector. This Start of Sector signal 68 is input to the Sync Enable circuit 54, to act alternatively with the Sector Mark Sync Signal 52 to generate the Sync Enable signal 56, mentioned above. If the Sector Mark is detected, the Sync Enable signal 56 occurs and prompts the AMD 58 to synchronize the Timing Generator 62. If a Sector Mark is not detected in a sector, the Start of Sector signal 68 will perform the same function and cause the Sync Enable signal 56 to occur. This gives the AMD 58 the chance to synchronize the Timing Generator 62 even if an occasional drop out of the Sector Mark were to occur. Under normal operation, the counters in the Timing Generator will be synchronized after the first AMS signal 60 occurs. However, as a precaution, the generator is synchronized on every sector, or 32 times per track, giving a high degree of reliability to the Tracking Pit Sampler timing.

The Timing Generator 62 also generates the important window pulse 61 which is open during the optical scan of the half-byte tracking pit fields 24. The two exemplary pits c and b shown in FIG. 3 can be related to the pits c and b for track (N) in FIGS. 4 and 6. When the sampler circuit 63 receives the window pulse 61 it generates two sampling signals, 1 and 2 (see FIGS. 13 and 15) which are directed to a double pole reversing switch 90 which is switched by an even-odd signal from the microprocessor to produce signals (h) and (j) which are fed to sample and hold circuits 92 and 94 respectively. An additional input to the sample and hold circuits are the analog signals (t), each pair of which represents the reading from a tracking pair (such as c and b in FIGS. 6 and 4). In FIG. 15 the first three pairs of analog pulses (t) represent an "on track" situation where the reading from the pit b on the outside of the track is the same amplitude as the reading from the pit c on the inside of the track. For this situation the outputs (k) and (l) from the sample and hold circuits 92 and 94 would remain at a constant level. However, for misalignment of the head and track, of which track crossing is the ultimate condition, as shown in FIG. 15, the response from the tracking pit pairs is dissimilar, creating stair step outputs from the sample and hold circuits. When these two signals (k) and (l) are subtracted from one another in the difference amplifier 95 a signal (m) is produced which is a very magnified version of the positive portion of the sine wave shown in FIG. 6, illustrating the crossing of two adjacent tracks.

As seen in FIG. 1 the tracking error signal (m) is fed to a track crossing detector 53 and to the control circuit 56 for the fine motor 40.

Still referring to FIG. 5, separated data (y) is fed to the Modified Frequency Modulation (MFM) decoder 64 where it is decoded into NRZ data (non return to zero) and fed, along with 1fClk and the present track number, to the serial to parallel converter 65. The NRZ track number is determined by the arrangement of the pits in the Track Number field 32a, as shown in FIG. 3 for one specific number. When the number is read by the MFM decoder 64 a NRZ track number signal 67 is generated, together with a Track Number Available signal 66. When the Track Number Available signal 66 occurs, the track number is latched and presented to the drive processor.

We claim:

1. A random access memory optical read/wire head positioning and tracking system for information storage media comprising;

Media carrying means having a plurality of tracks formed by the deposition in the media in multiple sector format of a plurality of optically readable pits and wherein the readable pits in each sector include a plurality of tracking pit pairs interspersed at intervals between groups of other serially deposited readable pits and wherein the pits of the pairs are bilaterally offset from the center line of the track to which they are related;

Central control means having a track address output;

An optical-system carrying head movable with respect to the media, wherein the optical system comprises a light source directed to the media and means responsive to light reflected from the pits to produce an electrical signal;

Open loop incremental actuator means responsive to the output of the control means and operable connected to the head for coarse positioning of the head in step movements transversely of the tracks; and A read/write head transverse velocity servomechanism loop, including motor means operable connected to the head, responsive to the central control means and the said electrical signals produced by light reflected from the pits to position the head over an addressed track.

2. The apparatus of claim 1 wherein the groups of other readable pits in a sector include:

A sector mark comprising a plurality of pits forming an asynchronously detectable code which is constant for all sectors and wherein the pits are written in pairs, each pit of which is bilaterally offset from the center line of the track to which they relate;

At least one synchronizing field comprising a plurality of pits forming a first unique code which is constant for all sectors and wherein the pits are written in pairs, each pit of which is bilaterally offset from the center line of the track to which they relate; and An address mark comprising a plurality of pits forming a second unique code which is different for each sector and wherein the pits are written in pairs, each pit of which is bilaterally offset from the center line of the track to which they relate.

3. The apparatus of claim 1 and further including analog signal reading and clock generation means comprising;

Comparator means responsive to the electrical signal produced by the light reflected from the said tracking pit pairs to produce a first pair of pulses as an output;

Signal differentiation means responsive to the said electrical signal produced by the light reflected from the tracking pit pairs to produce a signal;

Window pulse generating means responsive to the optical scan of each of the interspersed tracking pit pairs;

Digitizer means responsive to the generation of said window pulses and to the outputs of the differentiation means and the comparator means to produce a second pair of pulses as an output; and Phase locked loop means responsive to the said second pair of pulses to produce a first clocking signal.

4. The apparatus of claim 3 wherein the velocity servomechanism loop further includes;

Tracking error detection means comprising;

A sector mark detector for detecting a sector mark in the track and generating a first synchronizing signal in response thereto;

An address mark detector responsive to the output of the sector mark detector and a detected address mark in the track for generating a second synchronizing signal upon the coincidence of the first synchronizing signal and the address mark;

Means responsive to the electrical signal produced by the light reflected from the said pit pairs and responsive to the second synchronizing signal and the first clocking signal for generating a second clock signal; and Timing generator and counter means responsive to the second clock signal and the second synchronizing signal to generate window pulses coincident in time with the occurrence of the reflection of light from the offset tracking pit pairs.

5. The apparatus of claim 4 wherein the tracking error detection means further includes;

Means responsive to each window pulse to generate two sampling pulses coincident in time to the occurrence of the electrical signals generated by the light reflected from the respective tracking pits of the said pairs.

6. The apparatus of claim 5 wherein the tracking error detection means further includes;

Means responsive to unequal electrical signal amplitudes from the respective pits of the said pairs to generate a positive and negative going error signal which has both positive and negative slope in the general form of a sine wave; and Means communicating the error signal to the motor means.

7. The apparatus of claim 6 and further including;

Electrical detector means responsive to the changes in slope of the said error signal to count track crossings of the optical-system carrying head.

* * * * *